United States Patent
Wakabayashi et al.

(10) Patent No.: US 9,656,616 B2
(45) Date of Patent: May 23, 2017

(54) SHEET FOR FORMING RADIANT HEAT SHIELDING CORRUGATED TUBE, AND WIRE HARNESS

(71) Applicant: Sumitomo Wiring Systems, Ltd., Yokkaichi, Mie (JP)

(72) Inventors: Masataka Wakabayashi, Mie (JP); Kuniaki Kamijo, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/179,176

(22) Filed: Jun. 10, 2016

(65) Prior Publication Data

US 2016/0368436 A1   Dec. 22, 2016

(30) Foreign Application Priority Data

Jun. 17, 2015   (JP) .................. 2015-122237

(51) Int. Cl.
*H02G 3/04*   (2006.01)
*B60R 16/02*   (2006.01)

(52) U.S. Cl.
CPC .................. *B60R 16/0215* (2013.01)

(58) Field of Classification Search
CPC . H01B 17/58; H01B 7/00; H01B 7/29; H01B 17/00; H01B 17/586; H01B 17/60; B60R 16/02; B60R 16/027; B60R 16/0215; H02G 3/04; H02G 3/0468
USPC .... 174/68.1, 68.3, 72 A, 76, 88 R, 70 C, 95, 174/102 D, 32, 34; 138/118, 118.1, 121, 138/140
See application file for complete search history.

(56) References Cited

U.S. PATENT DOCUMENTS

| | | | | |
|---|---|---|---|---|
| 3,576,387 A | * | 4/1971 | Derby | H01B 7/28 174/36 |
| 3,950,604 A | * | 4/1976 | Penneck | H02G 15/068 174/73.1 |
| 4,450,871 A | * | 5/1984 | Sato | H01B 17/60 138/137 |
| 4,803,103 A | * | 2/1989 | Pithouse | H02G 15/1806 174/84 R |
| 5,872,334 A | * | 2/1999 | Trazyik | H01B 11/203 174/36 |

(Continued)

FOREIGN PATENT DOCUMENTS

JP   2009302023 A   12/2009

*Primary Examiner* — Angel R Estrada
(74) *Attorney, Agent, or Firm* — Reising Ethington, P.C.

(57) ABSTRACT

A sheet for forming a radiant heat shielding corrugated tube as well as a wire harness that provide protection from a metal edge and radiant heat shielding. A sheet for forming a radiant heat shielding corrugated tube includes a corrugated tube-forming sheet base material formed of a synthetic resin sheet that can be bent into a cylindrical shape through which an electric wire group passes with a gap left around the electric wire group, the sheet base material having groove portions on an outer surface side when bent into the cylindrical shape, the groove portions extending in a circumferential direction and being arranged at required intervals in an axial direction, a metal thin film formed on an outer surface of the sheet base material, and a urethane foam agent layer formed on an inner surface of the sheet base material.

4 Claims, 8 Drawing Sheets

(56) References Cited

U.S. PATENT DOCUMENTS

| | | | | |
|---|---|---|---|---|
| 6,015,600 A * | 1/2000 | Greuel, Jr. | ......... | H02G 15/1806 |
| | | | | 174/74 A |
| 8,957,310 B2 * | 2/2015 | Kaihotsu | ................... | H02G 3/04 |
| | | | | 174/68.3 |
| 9,505,358 B2 * | 11/2016 | Ichikawa | ............ | B60R 16/0207 |
| 9,531,173 B2 * | 12/2016 | Masuda | ............... | H02G 3/0468 |

* cited by examiner

SHEET FOR FORMING RADIANT HEAT SHIELDING CORRUGATED TUBE, AND WIRE HARNESS

This Application claims the benefit of Japanese Application No. JP2015-122237, filed on Jun. 17, 2015, the contents of which are hereby incorporated by reference in their entirety.

FIELD

The present invention relates to a sheet for forming a radiant heat shielding corrugated tube, and a wire harness.

BACKGROUND

Conventionally, depending on the location at which a wire harness is installed, protection of an electric wire from a metal edge or the like on a vehicle body side, for example, and a radiant heat shielding property are required, and so a corrugated tube having a radiant heat shielding property is attached to a wire harness trunk line.

In one method for imparting the radiant heat shielding property to a corrugated tube, a heat-insulating protective sheet formed of a heat-resistant foam rubber sheet is wrapped around an outer circumferential surface of an electric wire group of a wire harness, the heat-insulating protective sheet includes an adhesive layer on one surface and is wrapped around the electric wire group with the adhesive layer adhering to the outer circumference of the electric wire group, and the wrapped-around heat-insulating protective sheet is secured to itself via the adhesive layer to form a sheath (see JP 2009-302023A).

However, with this configuration, the function of protecting the electric wires from a metal edge or the like on the vehicle body side is not provided. To address this issue, conventionally, a configuration in which a metal foil is wrapped around an outer surface of a corrugated tube is already known as a configuration that can meet the requirements of protecting an electric wire from a metal edge or the like on the vehicle body side, and the radiant heat shielding property.

A conventional heat-resistant protective structure for an electric wire in which a metal foil is wrapped around the outer surface of a corrugated tube can be assembled through the steps illustrated in FIGS. 8A to 8D. That is to say, in order to realize the heat-resistant protective structure for an electric wire, conventionally, a portion of an electric wire group 70a that is to be routed in a high-temperature area and that is partially wrapped with an adhesive tape 71 is enclosed by a corrugated tube with slit 101 (see FIGS. 8A and 8B), a heat-resistant adhesive tape 102 is wrapped around the corrugated tube 101 in an overlapping manner (see FIG. 8C), and furthermore, a metal foil 103 is wrapped therearound (see FIG. 8D).

However, the heat-resistant protective structure for an electric wire illustrated in FIGS. 8A to 8D has the problem in that the necessity for the manual operation of wrapping the heat-resistant adhesive tape 102 around the corrugated tube 101 in an overlapping manner and the manual operation of wrapping the metal foil 103 is present and leads to an increase in the cost.

The present design was made to address a problem such as that described above, and it is an object thereof to provide a sheet for forming a radiant heat shielding corrugated tube as well as a wire harness, the sheet and the wire harness satisfying the requirements of protection from a metal edge or the like that may be present on the vehicle body side and the radiant heat shielding property, and enabling reduction in man-hours of manual operations.

SUMMARY

In order to achieve the above-described object, a corrugated tube-forming sheet includes a corrugated tube-forming sheet base material formed of a synthetic resin sheet that can be bent into a cylindrical shape through which an electric wire group passes with a required gap left around the electric wire group, the corrugated tube-forming sheet base material having groove portions that constitute grooves on an outer surface side of the corrugated tube-forming sheet base material when bent into the cylindrical shape, the groove portions extending in a circumferential direction of the cylinder and being arranged at required intervals in an axial direction of the cylinder, a metal thin film formed on an outer surface of the corrugated tube-forming sheet base material, and a urethane foam agent layer formed on an inner surface of the corrugated tube-forming sheet base material.

With this configuration, the sheet for forming a radiant heat shielding corrugated tube can be stored in a stacked state after manufacturing, until the sheet for forming a radiant heat shielding corrugated tube is to be used to protect an electric wire group. Moreover, when the sheet for forming a radiant heat shielding corrugated tube is used to protect the electric wire group, a urethane foam cylindrical body is formed by bending the sheet for forming a radiant heat shielding corrugated tube into a cylindrical shape with the electric wire group passing therethrough, unopenably closing both end portions of the sheet for forming a radiant heat shielding corrugated tube in a width direction, and foaming the urethane foam agent layer. Thus, the requirements of protection from a metal edge or the like that may be present on the vehicle body side and the radiant heat shielding property are satisfied, and the man-hours of manual operations can be reduced.

In order to achieve the above-described object, the present wire harness includes an electric wire group and the sheet for forming a radiant heat shielding corrugated tube, wherein the sheet for forming a radiant heat shielding corrugated tube is bent into a cylindrical shape with the electric wire group passing therethrough, and both end portions of the sheet for forming a radiant heat shielding corrugated tube in a width direction are unopenably closed, and the sheet for forming a radiant heat shielding corrugated tube thus forms a urethane foam cylindrical body in which the urethane foam agent layer is foamed and which occupies a space around the electric wire group.

With this configuration, the present wire harness can protect the electric wires from a metal edge or the like that may be present on the vehicle body side, because the urethane foam cylindrical body is formed by bending the sheet for forming a radiant heat shielding corrugated tube, the sheet being constituted by the corrugated tube-forming sheet base material made of a synthetic resin, into a cylindrical shape with the electric wire group passing therethrough.

Moreover, the present wire harness can improve the radiant heat shielding function, because in a state in which the urethane foam cylindrical body is formed by bending the sheet for forming a radiant heat shielding corrugated tube into a cylindrical shape, the metal thin film, which is formed on the outer surface of the corrugated tube-forming sheet base material, and the urethane foam agent layer, which is formed on the inner surface and which is foamed to have an increased thickness, have the heat-insulating effect.

Moreover, the present wire harness can reduce the man-hours of manual operations, because even though the operation of forming the urethane foam cylindrical body by bending the sheet for forming a radiant heat shielding corrugated tube into a cylindrical shape and the heating operation for foaming the urethane foam agent layer are necessary, the operation of wrapping a heat-resistant adhesive tape around the urethane foam cylindrical body in an overlapping manner and the operation of wrapping a metal foil are unnecessary.

It is possible to employ a configuration in which the urethane foam agent layer is foamed by heating the urethane foam cylindrical body after the sheet for forming a radiant heat shielding corrugated tube is bent into a cylindrical shape with the electric wire group passing therethrough, and the end portions in the width direction are unopenably closed.

With this configuration, the present wire harness can be routed at an appropriate position, because the urethane foam cylindrical body can be easily formed by passing the electric wire group through the sheet for forming a radiant heat shielding corrugated tube (bent into a cylinder) in a state in which the sheet for forming a radiant heat shielding corrugated tube has a small thickness with the urethane foam agent layer being not yet foamed, and in this state position adjustment can be performed as appropriate.

Moreover, it is also possible to employ a configuration in which the urethane foam cylindrical body is formed by bending the sheet for forming a radiant heat shielding corrugated tube into a cylindrical shape with the electric wire group passing therethrough, after the urethane foam agent layer is foamed by heating the sheet for forming a radiant heat shielding corrugated tube in sheet form.

With this configuration, routing of the present wire harness can be completed by simply forming the urethane foam cylindrical body by bending the sheet for forming a radiant heat shielding corrugated tube in which the urethane foam agent layer has been foamed in advance, into a cylindrical shape with the electric wire group passing therethrough, and exposure of the electric wire group to heat can be prevented.

According to the present design, it is possible to provide a sheet for forming a radiant heat shielding corrugated tube as well as a wire harness, the sheet and the wire harness satisfying the requirements of protection from a metal edge or the like that may be present on the vehicle body side and the radiant heat shielding property, and enabling reduction in man-hours of manual operations.

DRAWINGS

DESCRIPTION

Hereinafter, embodiments of a sheet for forming a radiant heat shielding corrugated tube as well as a wire harness according to the present invention will be described with reference to the drawings.

First Embodiment

Figure 1A:
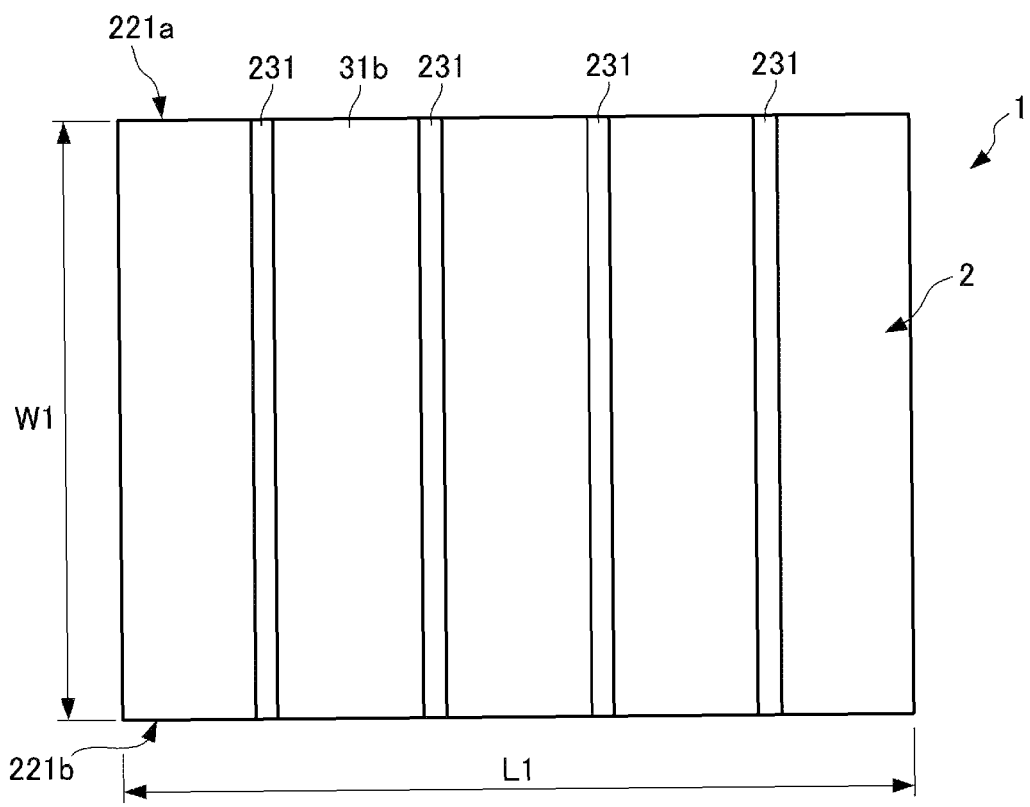
FIG. 1A is a plan view showing the shape of a sheet for forming a radiant heat shielding corrugated tube according to a first embodiment when the sheet is spread out in a plane.
Figure 1B:
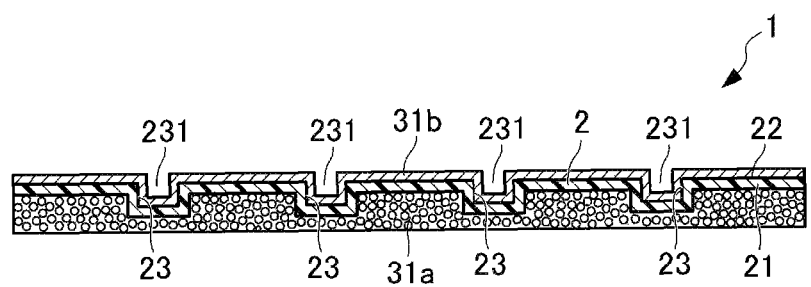
FIG. 1B is a lower side view of the sheet in FIG. 1A.

As shown in FIGS. 1A and 1B, a sheet for forming a radiant heat shielding corrugated tube (hereinafter sometimes referred to as "corrugated tube-forming sheet") 1 according to a first embodiment includes a corrugated tube-forming sheet base material (hereinafter sometimes referred to as "sheet base material") 2, a urethane foam agent layer 31a formed on an inner surface 21 of the sheet base material 2, and a metal thin film 31b formed on an outer surface 22 of the sheet base material 2.

As shown in FIG. 1A, the sheet base material 2 is composed of a rectangular sheet-like member having a width W1 and a length L1, for example. In the case where an electric wire group 70a, which will be described later, is to be protected, the sheet base material 2 is used as a urethane foam cylindrical body 4 that is formed by bending the sheet base material 2 into a cylindrical shape as shown in FIGS. 2A to 2C and 3. The width W1 corresponds to the length of the urethane foam cylindrical body 4 in a circumferential direction, and the length L1 corresponds to the length of a protection target section of the electric wire group 70a.

The sheet base material 2 has a plurality of groove portions 23 that are continuously formed between two sides of the rectangle that are opposite to each other in the width direction, that is, end portions 221a and 221b in the width direction. The plurality of groove portions 23 are formed at regular intervals in the length direction of the sheet base material 2. The sheet base material 2 in which the plurality of groove portions 23 are formed has an uneven cross-sectional shape as shown in FIG. 1B.

The sheet base material 2 is made of a synthetic resin such as polypropylene (PP), for example. Moreover, on the sheet base material 2, the urethane foam agent layer 31a is formed by applying a urethane foam agent to the entire inner surface 21. Also, on the sheet base material 2, the metal thin film 31b that is provided on the entire outer surface 22 is an aluminum thin film and is formed by vacuum deposition or a high-frequency ion plating process.

In the step of applying the urethane foam agent, the urethane foam agent is applied to the uneven inner surface 21 of the sheet base material 2 so that a top surface of the applied surface becomes flat, for example. On the other hand, in the step of forming the above-described thin film, the metal thin film 31b is formed on the entirety of the uneven outer surface 22 of the sheet base material 2 so as to have a uniform thickness. Thus, on the sheet base material 2, an internal surface constituted by the urethane foam agent layer 31a is flat, and an external surface constituted by the metal thin film 31b has grooves 231 that reflect the shape of the groove portions 23 formed in the outer surface 22.

In order to form a corrugated tube for protecting the electric wire group 70a, that is, the urethane foam cylindrical body 4 shown in FIGS. 2A to 2C and 3, using the corrugated tube-forming sheet 1, a corrugated tube-forming sheet 1 having a width (W1) corresponding to a length that is longer than the circumferential length of the electric wire group 70a and a length corresponding to the length of the protection target section of the electric wire group 70a is prepared.

Figure 2A:
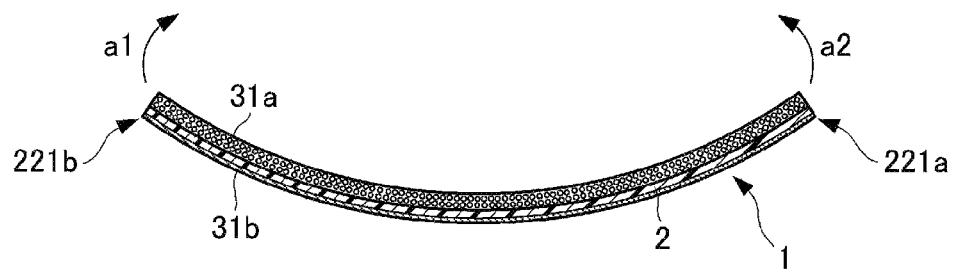
FIGS. 2A to 2C are perspective views illustrating assembly steps of a urethane foam cylindrical body using the sheet for forming a radiant heat shielding corrugated tube according to the first embodiment.

Next, as shown in FIG. 2A, the prepared corrugated tube-forming sheet 1 is oriented such that the urethane foam agent layer 31a is on an inward side, and then the end portions 221a and 221b in the width direction are bent in directions a2 and a1, respectively, until the end portions 221a and 221b come into contact with each other. While bending is continued, when the end portions 221a and 221b of the corrugated tube-forming sheet 1 in the width direction come into contact with each other, the corrugated tube-forming sheet 1 is further bent so that those portions of the urethane foam agent layer 31a that are located on the inside of the respective end portions 221a and 221b in the width direction abut against each other like hands in prayer, as shown FIG. 2B.

After that, the end portions 221a and 221b in the width direction that are abutting against each other like hands in prayer are unopenably closed, and thus the urethane foam cylindrical body 4 is formed. In order to close the end portions 221a and 221b in the width direction so as to attain an unopenable state, for example, as shown in FIG. 2C, the entire end portions 221a and 221b in the width direction that are abutting against each other like hands in prayer can be heated and then crimped from the outside using a heat crimper 90, for example, and thus the corresponding portions of the urethane foam agent layer 31a can be melted and bonded to each other.

Figure 2B:
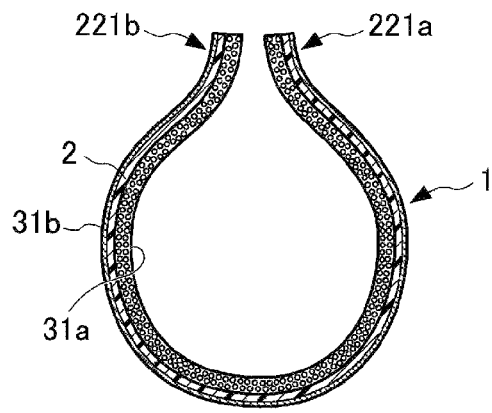
Figure 2C:
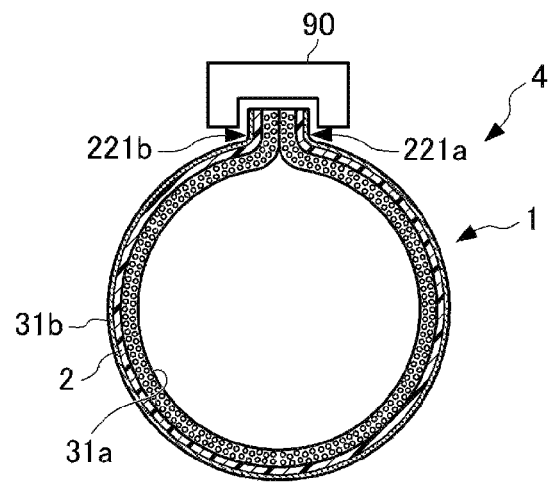
Figure 3:
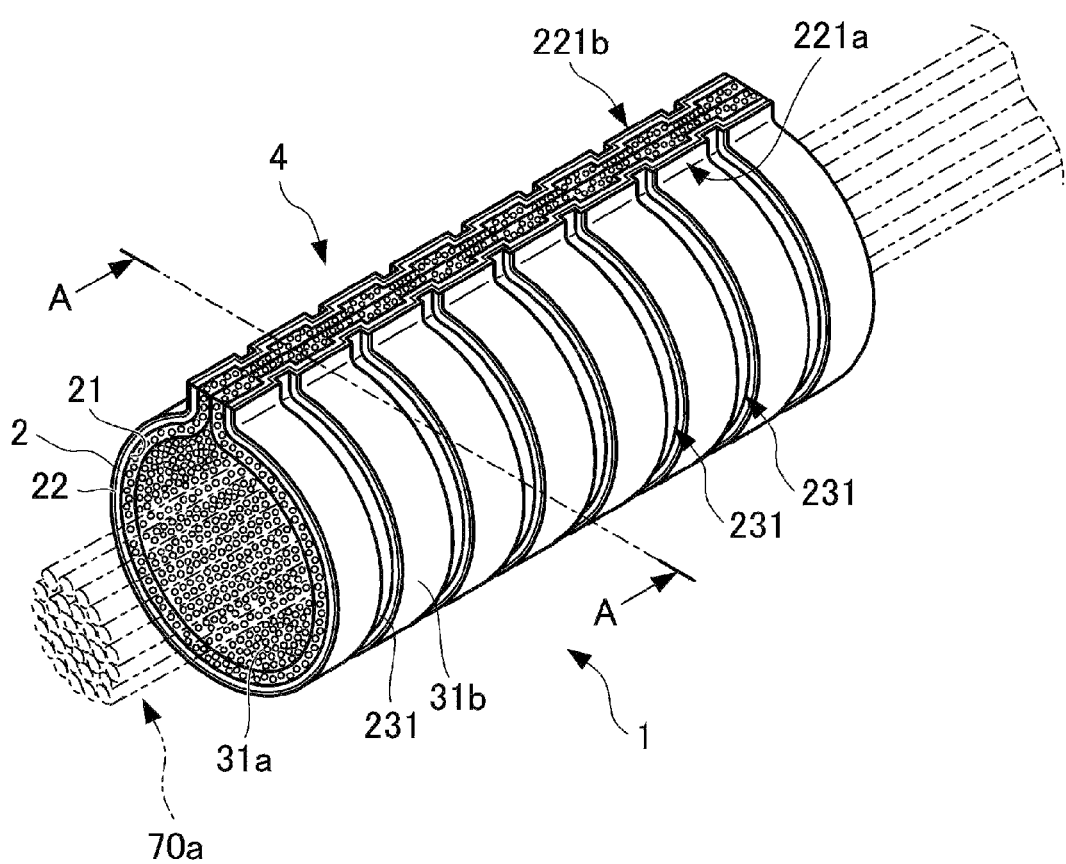
FIG. 3 is a perspective view showing an external structure of the urethane foam cylindrical body according to the first embodiment.

The urethane foam cylindrical body 4 that is formed through the steps illustrated in FIGS. 2A to 2C has an external structure in which the grooves 231 extending in the circumferential direction of the cylinder are formed at required intervals in an axial direction of the cylinder as shown in FIG. 3. The grooves 231 reflect the shape of the groove portions 23 provided in the sheet base material 2 of the corrugated tube-forming sheet 1 forming the urethane foam cylindrical body 4.

The urethane foam cylindrical body 4 shown in FIG. 3 forms a wire harness 5 (see FIG. 4C), which will be described later, by the urethane foam agent layer 31a being foamed in a state in which the electric wire group 70a is inserted into the inside of the cylinder as shown in the dotted lines, for example. FIG. 3 especially shows a state in which the urethane foam agent layer 31a formed on the inner surface 21 of the sheet base material 2 of the corrugated tube-forming sheet 1 is not yet foamed, that is, a state in which a required gap is left around the electric wire group 70a when the electric wire group 70a passes through the cylinder.

As described above, the corrugated tube-forming sheet 1 of the present embodiment includes the corrugated tube-forming sheet base material 2 formed of a synthetic resin sheet that can be bent into a cylindrical shape through which the electric wire group 70a passes with a required gap left around the electric wire group 70a, the corrugated tube-forming sheet base material 2 having the groove portions 23 that constitute the grooves 231 on the outer surface side of the corrugated tube-forming sheet base material 2 when bent into the cylindrical shape, the groove portions 23 extending in the circumferential direction of the cylinder and being arranged at required intervals in the axial direction of the cylinder, the metal thin film 31b formed on the outer surface 22 of the corrugated tube-forming sheet base material 2, and the urethane foam agent layer 31a formed on the inner surface 21 of the corrugated tube-forming sheet base material 2.

With the above-described configuration, the corrugated tube-forming sheet 1 of the present embodiment can be stored in a stacked state after manufacturing, until the corrugated tube-forming sheet 1 is to be used to protect an electric wire group. Thus, the storage space can be reduced. On the other hand, when the corrugated tube-forming sheet 1 is used to protect the electric wire group 70a, the urethane foam cylindrical body 4 (see FIG. 3) is formed by bending the corrugated tube-forming sheet 1 into a cylindrical shape with the electric wire group 70a passing therethrough, unopenably closing the end portions 221a and 221b of the corrugated tube-forming sheet 1 in the width direction, and foaming the urethane foam agent layer 31a. Thus, the requirements of the protection of the electric wire group 70a from a metal edge or the like that may be present on the vehicle body side and the radiant heat shielding property are satisfied, and the man-hours of manual operations can be reduced because, unlike conventional configurations, the manual operation of wrapping the metal foil is unnecessary.

Wire Harness

Next, a wire harness of the present embodiment will be described with reference to FIGS. 4A to 4C.

Figures 4A, 4B, 4C:
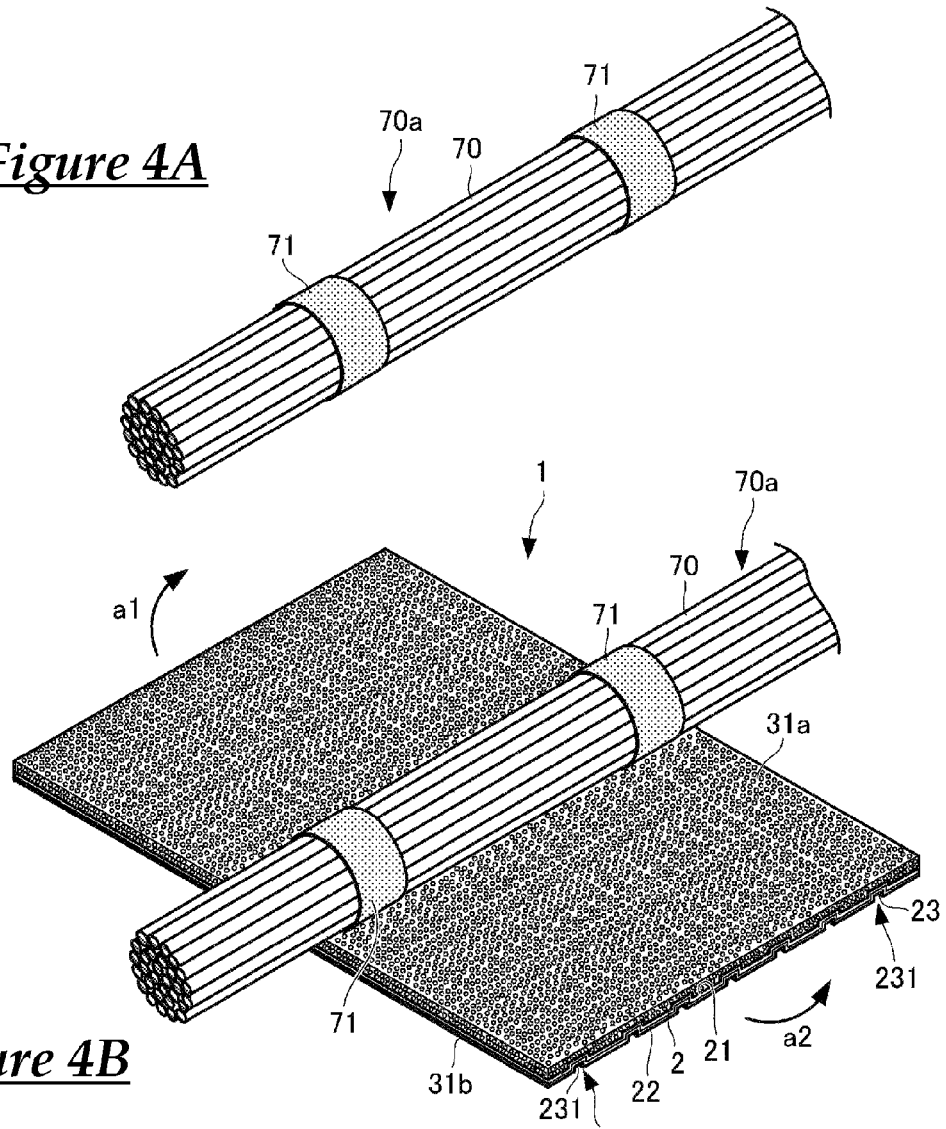
FIGS. 4A to 4C are perspective views illustrating an assembly configuration of a wire harness using the sheet for forming a radiant heat shielding corrugated tube according to the first embodiment.

In order to protect a harness trunk line using the corrugated tube-forming sheet 1 of the present embodiment, first, as shown in FIG. 4A, a plurality of electric wires 70 to be protected are partially tied together as the electric wire group 70a using the adhesive tape 71.

Next, as shown in FIG. 4B, the corrugated tube-forming sheet 1 having a length corresponding to, for example, the length of the protection target section of the electric wire group 70a is prepared and placed in a position in which the inner surface, that is, the surface on which the urethane foam agent layer 31a is formed, of the corrugated tube-forming sheet 1 opposes the partially-tied electric wire group 70a and also the length direction of the electric wire group 70a is the same as the length direction of the corrugated tube-forming sheet 1, that is, the direction in which the grooves 231 on the outer surface are arranged.

Next, from the state shown in FIG. 4B, the end portions 221a and 221b in the width direction are bent in the directions a2 and a1, respectively, so that the electric wire group 70a is wrapped up in the corrugated tube-forming sheet 1. When bending is performed until those portions of the urethane foam agent layer 31a that are located on the inside of the respective end portions 221a and 221b of the corrugated tube-forming sheet 1 in the width direction abut against each other like hands in prayer, the end portions 221a and 221b in the width direction are unopenably closed as shown in FIG. 4C using the aforementioned heat crimper 90, for example, to form the urethane foam cylindrical body 4. This urethane foam cylindrical body 4 can be configured through the steps illustrated in FIGS. 2A to 2C.

In FIG. 4C, a structure in which the electric wire group 70a is accommodated in the inside of the cylinder of the urethane foam cylindrical body 4 so as to extend in the axial direction of the cylinder constitutes the wire harness 5 of the present embodiment. In the wire harness 5, afterward, the urethane foam agent can be foamed by heating the urethane foam cylindrical body 4 at 80° C. or more, for example, from outside the urethane foam cylindrical body 4.

Figure 5:
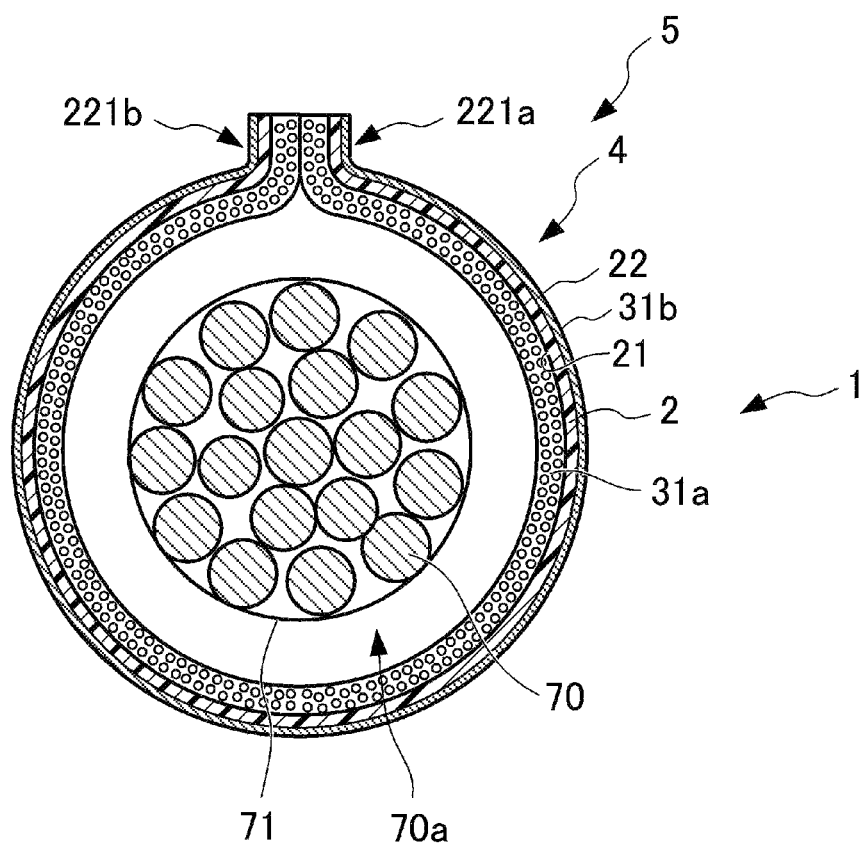
FIG. 5 shows a configuration of a cross section taken along line A-A of the wire harness shown in FIG. 4C before a heating step.

In the above-described wire harness 5, when the corrugated tube-forming sheet 1 is in a state in which the end portions 221a and 221b in the width direction are unopenably closed as shown in FIG. 4C, and before heating of the urethane foam cylindrical body 4, as shown in FIG. 5, the urethane foam agent layer 31a, which is formed inside the cylinder of the urethane foam cylindrical body 4, is spaced apart from the surface of the electric wire group 70a, and a gap is formed between the urethane foam agent layer 31a and the electric wire group 70a.

Figure 6:
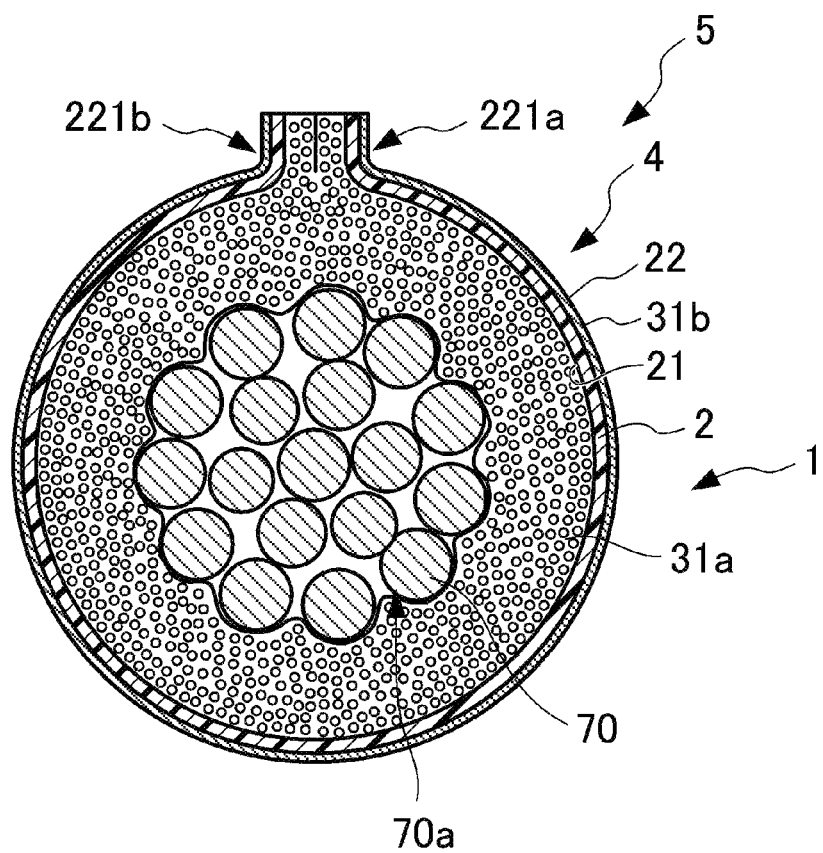
FIG. 6 shows a configuration of the cross section taken along line A-A of the wire harness shown in FIG. 4C after the heating step.

When the heating step (see FIG. 4C) is performed in this state by performing heating in the above-described manner, as shown in FIG. 6, the urethane foam agent layer 31a is foamed at the aforementioned heating temperature and thus expanded to a volume that is about three times or more the original volume. Thus, the urethane foam agent layer 31a is foamed so as to fill the gap between the urethane foam agent layer 31a and the electric wire group 70a, and abuts against the electric wire group 70a in a state of tightly holding the electric wire group 70a. Here, in the state in which the urethane foam agent layer 31a is foamed, the effect of the increase in the volume of the urethane foam agent layer 31a, and the metal thin film 31b provided on a rear side of the urethane foam agent layer 31a enhance the heat-insulating performance, that is, the radiant heat shielding function.

Moreover, the above-described effect is achieved by the heat treatment in the heating step of the corrugated tube-forming sheet 1 that is formed into the urethane foam cylindrical body 4 shown in FIGS. 4C and 6, and unlike conventional configurations, the manual operations of wrapping the heat-resistant adhesive tape around the corrugated tube in an overlapping manner and then further wrapping the metal foil are unnecessary and accordingly, manual operations corresponding to those operations can be reduced.

As described above, the wire harness 5 of the present embodiment includes the electric wire group 70a and the corrugated tube-forming sheet 1, and has a configuration in which the corrugated tube-forming sheet 1 is bent into a cylindrical shape with the electric wire group 70a passing therethrough, the end portions 221a and 221b of the corrugated tube-forming sheet 1 in the width direction are unopenably closed, and the corrugated tube-forming sheet 1 thus forms the urethane foam cylindrical body 4 in which the urethane foam agent layer 31a is foamed and which occupies the space around the electric wire group 70a.

With the above-described configuration, the wire harness 5 of the present embodiment can protect the electric wires from a metal edge or the like that may be present on the vehicle body side, because the urethane foam cylindrical body 4 is formed by bending the corrugated tube-forming sheet 1 constituted by the sheet base material 2 made of a synthetic resin into a cylindrical shape with the electric wire group 70a passing therethrough.

Moreover, the wire harness 5 of the present embodiment can improve the radiant heat shielding function, because in the state in which the urethane foam cylindrical body 4 is formed by bending the corrugated tube-forming sheet 1 into a cylindrical shape, the metal thin film 31b, which is formed on the outer surface 22 of the sheet base material 2, and the urethane foam agent layer 31a, which is formed on the inner surface 21 and which is foamed to have an increased thickness, have the heat-insulating effect.

Moreover, the wire harness 5 of the present embodiment can reduce the man-hours of manual operations, because even though the operation of forming the urethane foam cylindrical body 4 by bending the corrugated tube-forming sheet 1 into a cylindrical shape and the heating operation for foaming the urethane foam agent layer 31a are necessary, the operation of wrapping a heat-resistant adhesive tape around the urethane foam cylindrical body 4 in an overlapping manner and the operation of wrapping a metal foil are unnecessary.

Moreover, the wire harness 5 of the present embodiment has a configuration in which the urethane foam agent layer 31a is foamed by heating the urethane foam cylindrical body 4 after the corrugated tube-forming sheet 1 is bent into a cylindrical shape with the electric wire group 70a passing therethrough, and the two end portions 221a and 221b of the corrugated tube-forming sheet 1 in the width direction are unopenably closed.

With the above-described configuration, the wire harness 5 of the present embodiment can be routed at an appropriate position, because the urethane foam cylindrical body 4 can be easily formed by passing the electric wire group 70a through the corrugated tube-forming sheet 1 (bent into a cylinder) in a state in which the corrugated tube-forming sheet 1 has a small thickness with the urethane foam agent layer 31a being not yet foamed, and in this state position adjustment can be performed as appropriate.

Second Embodiment

Next, a wire harness 5A of a second embodiment will be described with reference to FIGS. 7A to 7C. It should be noted that with respect to the wire harness 5A shown in FIGS. 7A to 7C, the same components as those of the wire harness 5 of the first embodiment shown in FIGS. 4A to 4C are denoted by the same reference numerals, and their description is omitted. The following description mainly focuses on the differences.

Wire Harness

The wire harness 5A of the present embodiment is configured using the same corrugated tube-forming sheet 1 as that of the first embodiment. However, in the present embodiment, a urethane foam cylindrical body 4A is formed to accommodate the electric wire group 70a after the urethane foam agent layer 31a applied to the corrugated tube-forming sheet 1 is foamed.

Figure 7A:
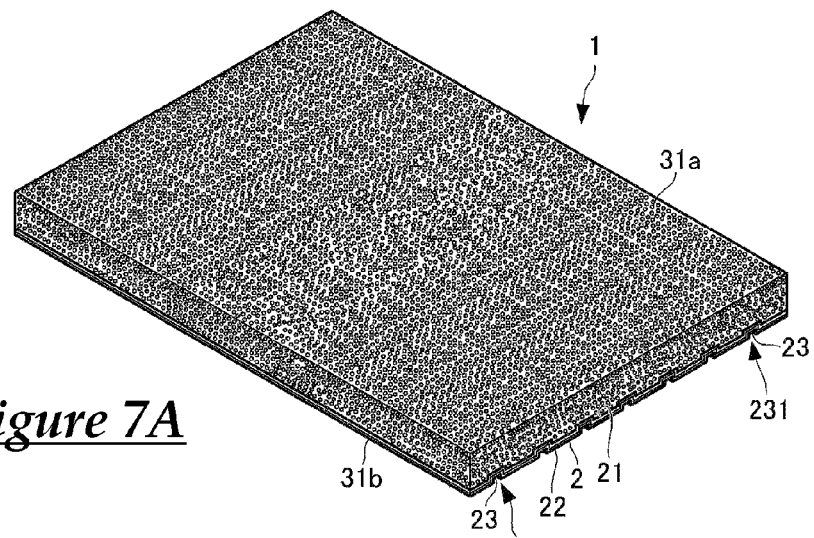
FIGS. 7A to 7C are perspective views illustrating an assembly configuration of a wire harness using a sheet for forming a radiant heat shielding corrugated tube according to a second embodiment.

In the present embodiment, in order to protect a harness trunk line using the corrugated tube-forming sheet 1, first, as shown in FIG. 7A, the corrugated tube-forming sheet 1 of a predetermined size is prepared, and the urethane foam agent layer 31a is foamed by heating the corrugated tube-forming sheet 1 at 80° C. or more from the urethane foam agent layer 31a side, for example. At this time, the urethane foam agent layer 31a expands to a volume that is about three times or more the original volume.

Figure 7B:
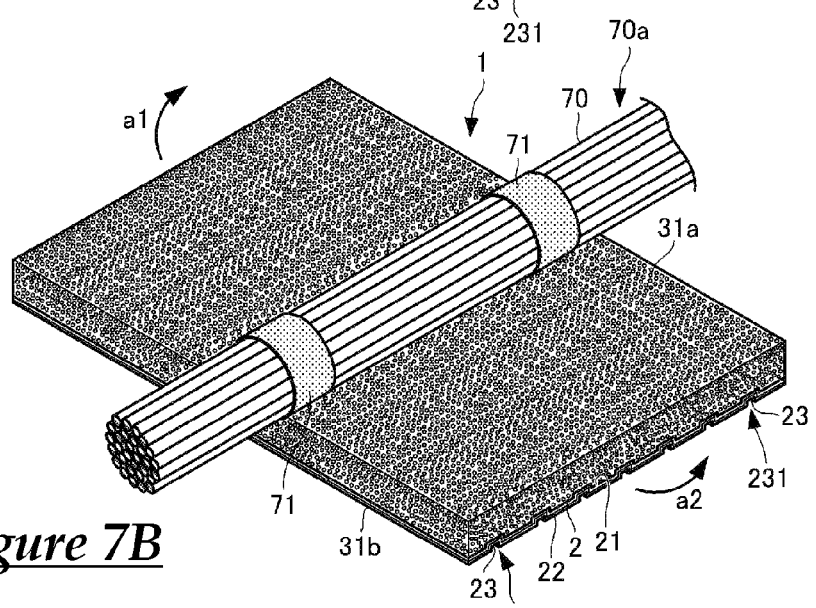

Next, as shown in FIG. 7B, the corrugated tube-forming sheet 1 with the thus foamed urethane foam agent layer 31a is placed relative to the electric wire group 70a that is partially tied with the adhesive tape 71 such that the length direction of the corrugated tube-forming sheet 1 is the same as the length direction of the electric wire group 70a. Next, from this state, the end portions 221a and 221b in the width direction are bent in the directions a2 and a1, respectively, so that the electric wire group 70a is wrapped up in the corrugated tube-forming sheet 1.

Figure 7C:
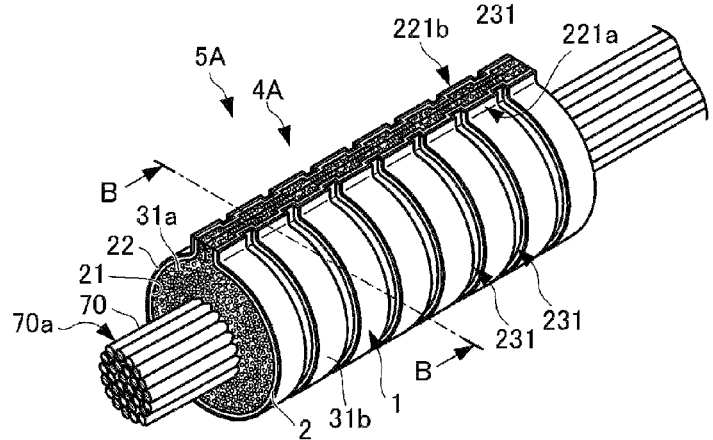
Figure 8A:
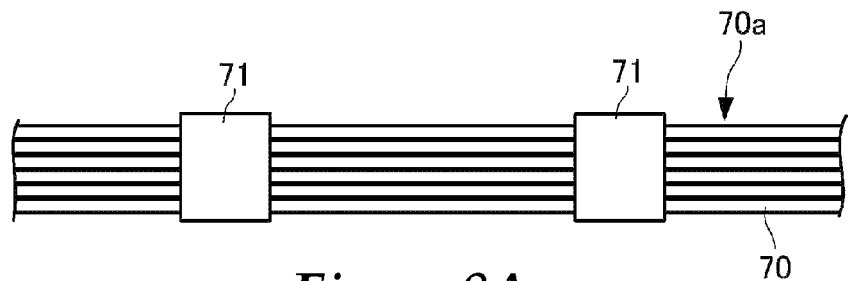
FIGS. 8A to 8D illustrate assembly steps of a conventional heat-resistant protective structure for an electric wire.
Figure 8B:
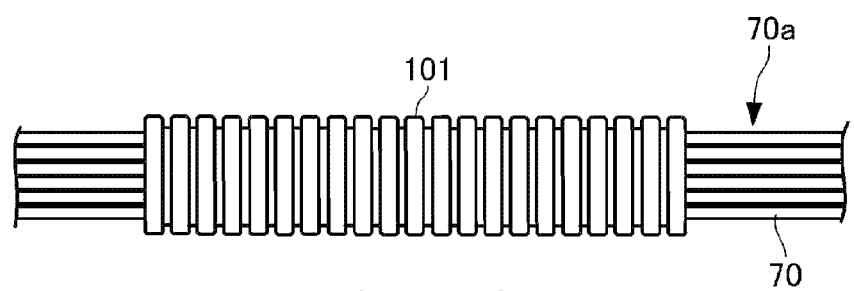
Figure 8C:
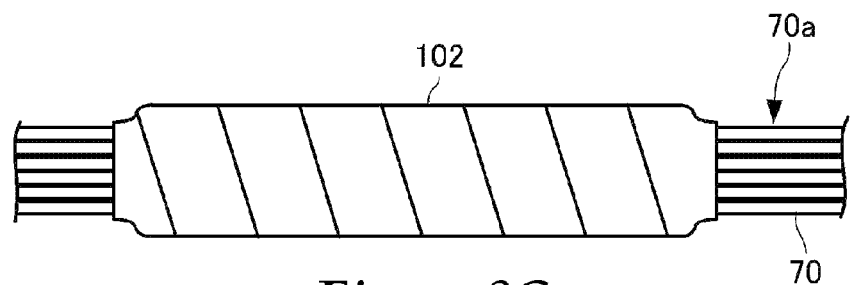
Figure 8D:
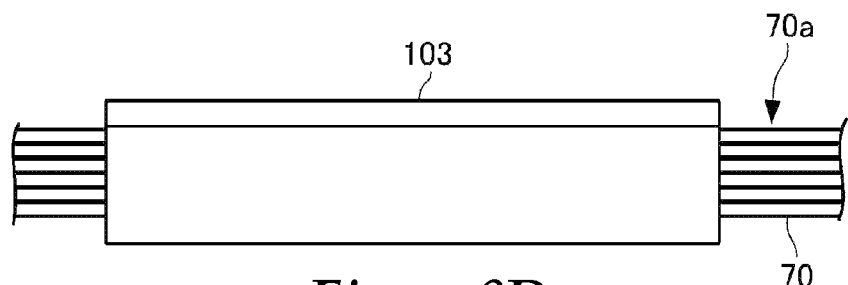

After that, when bending is performed until those portions of the urethane foam agent layer 31a that are located on the inside of the respective end portions 221a and 221b of the corrugated tube-forming sheet 1 in the width direction abut against each other like hands in prayer, as shown in FIG. 7C, the end portions 221a and 221b in the width direction are unopenably closed in the same procedure as illustrated in FIGS. 2C and 4C to form the urethane foam cylindrical body 4A.

In the step of forming the above-described urethane foam cylindrical body 4A, at the stage of starting bending of the corrugated tube-forming sheet 1, the urethane foam agent layer 31a has already been foamed and expanded (see FIG. 7A). Thus, afterward, when the corrugated tube-forming sheet 1 is bent until the end portions 221a and 221b in the width direction are joined together like hands in prayer, the expanded urethane foam agent layer 31a abuts against the electric wire group 70a in a state of tightly holding the electric wire group 70a.

Thus, the wire harness 5A constituted by the urethane foam agent layer 31a that is completed by unopenably closing the end portions 221a and 221b in the width direction and the electric wire group 70a that is inserted into the inside of the cylinder has a structure equivalent to that of the wire harness 5 of the first embodiment shown in FIG. 4C. That is to say, the cross-sectional shape of the wire harness 5A in FIG. 7C is the same as the cross-sectional shape shown in FIG. 6.

As described above, the wire harness 5A of the present embodiment has the same effects as the first embodiment, because as in the case of the first embodiment, the corrugated tube-forming sheet 1 is bent into a cylindrical shape with the electric wire group 70a passing therethrough, the end portions 221a and 221b of the corrugated tube-forming sheet 1 in the width direction are unopenably closed, and the corrugated tube-forming sheet 1 thus forms the urethane foam cylindrical body 4A in which the urethane foam agent layer 31a is foamed and which occupies the space around the electric wire group 70a.

Moreover, the wire harness 5A of the present embodiment has a configuration in which the urethane foam cylindrical body 4A is formed by bending the corrugated tube-forming sheet 1 into a cylindrical shape with the electric wire group 70a passing therethrough, after the urethane foam agent layer 31a is foamed by heating the corrugated tube-forming sheet 1 in sheet form.

With the above-described configuration, routing of the wire harness 5A of the present embodiment can be completed by simply forming the urethane foam cylindrical body 4 by bending the corrugated tube-forming sheet 1 in which the urethane foam agent layer 31a has been foamed in advance, into a cylindrical shape with the electric wire group 70a passing therethrough, and exposure of the electric wire group 70a to heat can be prevented.

Other Embodiments

The present invention is not limited to the foregoing embodiments, and the technical scope of the claims embraces modifications in which various design changes are made without departing from the gist of the invention. For example, although it is assumed in the first and second embodiments that a plurality of corrugated tube-forming sheets 1 of a predetermined size are formed, a long corrugated tube-forming sheet 1 having a constant width may also be formed and used cut to a length corresponding to the length of the protection target section. In short, according to the present invention, the width and length of the corrugated tube-forming sheet 1 and the size, shape, arrangement pitch, and the like of the groove portions can be determined as desired.

As described above, the present design satisfies the requirements of protection from a metal edge or the like that may be present on the vehicle body side and the radiant heat shielding property, has the effect of enabling reduction in man-hours of manual operations, and is thus useful for a sheet for forming a radiant heat shielding corrugated tube as well as all wire harnesses.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A sheet for forming a radiant heat shielding corrugated tube, the sheet comprising:
    a corrugated tube-forming sheet base material formed of a synthetic resin sheet that can be bent into a cylindrical shape through which an electric wire group passes with a required gap left around the electric wire group, the corrugated tube-forming sheet base material having groove portions that constitute grooves on an outer surface side of the corrugated tube-forming sheet base material when bent into the cylindrical shape, the groove portions extending in a circumferential direction of the cylinder and being arranged at required intervals in an axial direction of the cylinder;
    a metal thin film formed on an outer surface of the corrugated tube-forming sheet base material; and
    a urethane foam agent layer formed on an inner surface of the corrugated tube-forming sheet base material.

2. A wire harness comprising:
    an electric wire group; and
    the sheet for forming a radiant heat shielding corrugated tube according to claim 1, wherein the sheet for forming a radiant heat shielding corrugated tube is bent into a cylindrical shape with the electric wire group passing therethrough, and both end portions of the sheet for forming a radiant heat shielding corrugated tube in a width direction are unopenably closed, and
    the sheet for forming a radiant heat shielding corrugated tube thus forms a urethane foam cylindrical body in which the urethane foam agent layer is foamed and which occupies a space around the electric wire group.

3. The wire harness according to claim 2, wherein the urethane foam agent layer is foamed by heating the urethane foam cylindrical body after the sheet for forming a radiant heat shielding corrugated tube is bent into the cylindrical shape with the electric wire group passing therethrough, and the two end portions are unopenably closed.

4. The wire harness according to claim 2, wherein the urethane foam cylindrical body is formed by bending the sheet for forming a radiant heat shielding corrugated tube into a cylindrical shape with the electric wire group passing therethrough, after the urethane foam agent layer is foamed by heating the sheet for forming a radiant heat shielding corrugated tube in sheet form.

* * * * *